June 11, 1968
G. H. SCHRINK
3,387,712
FILTER BACKWASH DIFFUSER
Filed Nov. 14, 1966
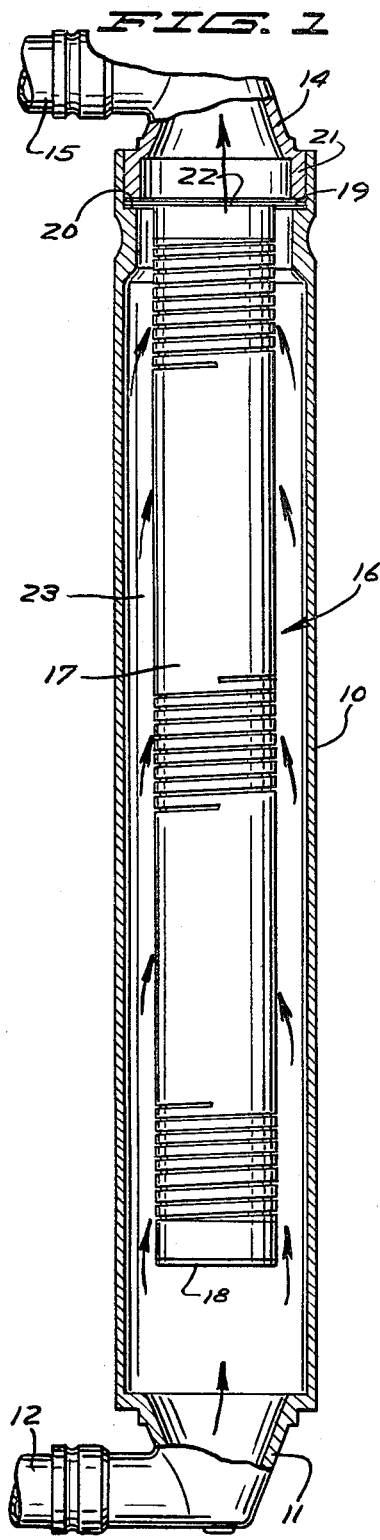
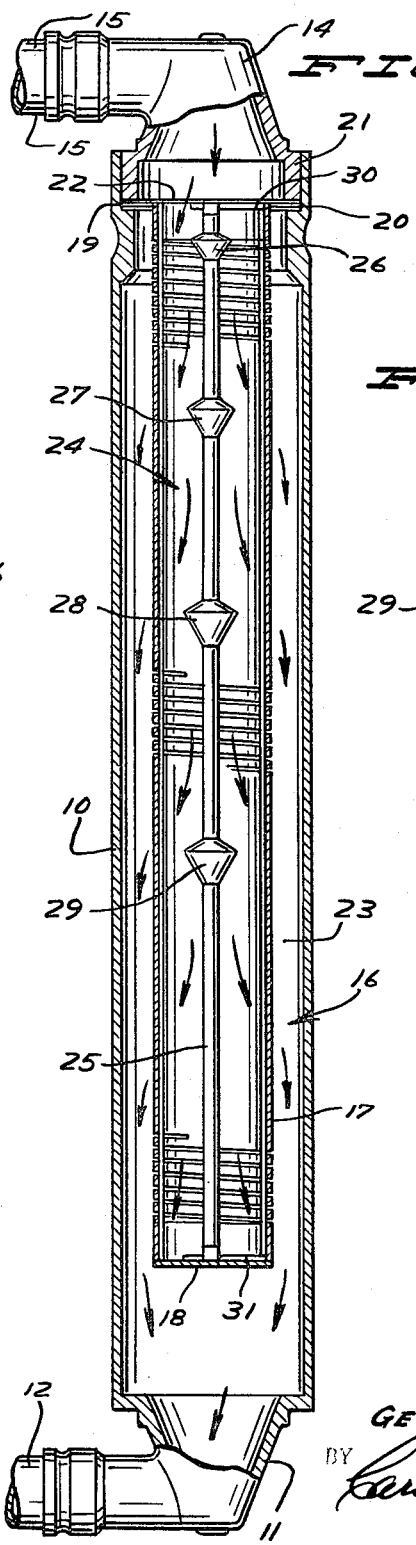
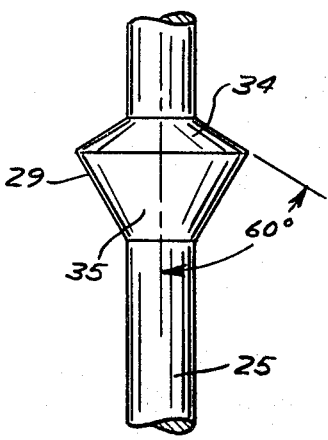
INVENTOR.
GEORGE H. SCHRINK
BY
*Carlsen, Carlsen & Sturm*
ATTORNEYS

United States Patent Office 3,387,712
Patented June 11, 1968

3,387,712
FILTER BACKWASH DIFFUSER
George H. Schrink, Kalamazoo, Mich., assignor to
Ronningen-Petter Company, Kalamazoo, Mich., a
corporation of Michigan
Filed Nov. 14, 1966, Ser. No. 594,053
4 Claims. (Cl. 210—411)

ABSTRACT OF THE DISCLOSURE

A device for diffusing backwash water flowing axially through a tubular perforate walled filter comprising a shaft mounted axially within the filter and having a plurality of lugs mounted in spaced relation therealong with the lugs having generally frusto-conical annular surfaces facing the flow to deflect the water in radial directions against the filter wall.

---

This invention relates generally to liquid filtration apparatus and more particularly concerns means for diffusing backwash liquids throughout the filtering medium during backwashing or cleaning of the filter.

In the filtration of liquids having a high viscosity or solids content, it is common to use filters having an upright tubular housing with a tubular filter screen disposed axially therein and with the liquid passing into one end of the housing, then radially inward through the filter screen and out the opposite end of the housing. During this process the unfiltered solids cling to the circumferential outer surface of the filter screen. Such materials are then removed from the screen by backwashing the filter through running water through the filter in a direction opposite to the normal operating flow.

One type of such fiter is disclosed in U.S. Patent No. 3,161,591, issued Dec. 15, 1964. In that device the fluid to be filtered moves upwardly through the filter housing while in the backwash cycle the liquid moves downwardly and outwardly through the filter screen. While this type of filter is very effective, it is found that large quantities of water must be used for backwashing and frequently only the bottom portion of the filter tube will be effectively cleaned.

The primary object of the present invention is to provide a device for diffusing backwash water throughout the filtering area of a tubular perforate walled filter to effectively and uniformly clean the filter during the backwash operation throughout its axial length.

Another object of the invention is to provide a filter backwash diffuser which enables thorough cleansing of an elongated tubular filter element with a minimum volume of backwash water.

With these objects in view the invention generally comprises an elongated support shaft mounted to extend within and along the axis of a tubular perforate walled filter element having a backwash water inlet at one end, a plurality of annular diffuser lugs mounted coaxially on the shaft and spaced longitudinally therealong, each diffuser member having a frusto-conical surface facing toward the inlet end of the fitler whereby portions of backwash water moving from the inlet and in an axial direction through the filter element will engage and deflect from said surfaces in generally radial directions outwardly against the wall of the filter element.

The invention in its preferred form is further characterized by providing diffuser lugs of gradually increasing diameter as they are spaced along the shaft away from the inlet.

Also in the preferred from the frusto-conical surface is disposed at an angle of between fifty degrees and seventy degrees to the axis of the shaft and the filter tube.

The above mentioned and still additonal objects of the invention will be brought to light during the course of the following specification, reference being made to the accompanying drawing, in which FIG. 1 is a vertical section taken through the filter casing with the filter tube shown in elevation. During the filtering operation liquids move upwardly through the casing and filter tube in the direction of the arrows.

FIG. 2 is similar to FIG. 1 but with the filter tube also shown in section and with the arrows indicating the direction of water flow during the backwash cycle.

FIG. 3 is an enlarged fragmentary view showing one of the diffuser lugs in elevation.

Referring now more particularly to the drawing reference numerals will be used to denote like parts or structural features in the different views. The number 10 denotes the outer tubular casing of the filter. The casing has a lower closure member in the form of an elbow 11 which connects the casing to a lower conduit 12. The upper end of the casing 10 is covered by an elbow fitting 14 which connects with a conduit 15.

The filter element itself is denoted generally by the numeral 16. It has a tubular wall 17 of slotted filter screening or other perforate material. The bottom end of the filter is closed by a plate 18. At its upper end the tube is provided with an annular flange 19 which rests upon the shoulder 20 provided in the upper end of the casing 10. The ring portion 21 is of fitting 14 rests upon the top of the flange 19 to hold the filter tube in position. The upper end of the filter tube 16 opens directly into fitting 14, the opening denoted by numeral 22.

So mounted the filter 16 is disposed coaxially within the casing 10 leaving an annular space 23 around the tube. The casing may be provided with a vibrator disposed under the tube as disclosed in the aforementioned Patent No. 3,161,591. However, such is not essential for use of the present invention.

The diffuser is denoted generally at 24 and comprises an elongated shaft 25 having a plurality of identically shaped diffuser lugs 26, 27, 28 and 29 mounted thereon. The upper and lower ends of shaft 25 are respectively held by clips 30 and 31 so that the shaft is in fixed position on the longitudinal axis of the tube.

While lugs 26 to 29 have the same shape they are gradually increasing in size from top to bottom. The lowermost lug 29 is shown enlarged in FIG. 3. The lug has a frusto-conical upper surface 34 which faces toward the open end 22 of the filter. The lower portion of the lug is tapered inwardly as at 35.

The spacing between the lugs gradually increases as they are positioned along the shaft 25 and all lugs are located on the upper seventy percent of the shaft.

As will be noted in FIG. 3 the surface 34 is disposed at an angle of sixty degrees to the longitudinal axis of shaft 25. This is found to be an ideal angle to give proper radial deflection of descending backwash water. For optimum results the angle should be in the range of fifty-five degrees to sixty-five degrees to the shaft axis.

In normal use of the filter the liquid enters from line 12 and rises through the casing 10 as denoted by the arrows in FIG. 1. The liquid passes inwardly through the openings in the filter wall 17, then upwardly through the opening 22 and into line 15. During the filtration cycle filtered out solids will cling to the outside surface of the filter wall 17 in normal manner. These are removed by backwashing. During this cycle the flow direction is reversed with fresh water moving in from line 15 through the open end 22 of the filter and downwardly through the casing in the direction indicated by the arrows in FIG. 2. This water as it passes radially outward through the wall 17 carries the solid material disposed on said wall outwardly into chamber 23 and then downwardly through the lower end of casing 10 and into line 12 through which it is disposed of.

As previously indicated, if no diffuser is used the backwash water will tend to fall directly to the bottom portion of the filter tube and effectively clean only the lower portion thereof. The diffuser 24, however, interrupts such direct movement or flow. As the backwash water descends in the tube it will engage the lug surfaces 34 and be deflected radially against wall 17 and out through the perforations therein to remove solids impinged thereon. It will be understood that certain portions of the flow will bounce inwardly off of the casing 10 through wall 17 and also off of wall 17 to again engage the surface of the next lower lug. Due to the gradually increasing size of the lugs the backwater agitation increases as the water descends through the filter tube 16. With use of the diffuser a substantially increased portion of the backwash water leaves the tube 16 through the upper portion of wall 17.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a filtering device having an elongated tubular outer casing and an elongated tubular perforate walled filter extending axially within the casing and having a backwash water inlet at one end thereof, a backwash water diffuser comprising a shaft extending axially within the filter, and a plurality of diffuser lugs mounted in spaced relation along the shaft, said lugs each having an annular frusto-conical surface facing toward the inlet to deflect backwash water passing from the inlet and axially through the filter outwardly against said filter wall.

2. The subject matter of claim 1 wherein said surface is disposed at an angle of between fifty-five degrees and sixty-five degrees to the shaft axis.

3. The subject matter of claim 1 wherein said lugs have a gradual increasing diameter as they are spaced away from said inlet.

4. The subject matter of claim 1 wherein said lugs are spaced along the shaft and all being located within the seventy percent of the filter adjacent to said inlet.

References Cited

UNITED STATES PATENTS

| | | | |
|---|---|---|---|
| 488,583 | 12/1892 | Sobotka et al. | 210—408 X |
| 722,632 | 3/1903 | Rothe | 210—407 X |
| 991,215 | 5/1911 | Kuhajda | 210—407 |
| 2,197,971 | 4/1940 | Elze et al. | 210—407 |
| 3,161,591 | 12/1964 | Petter et al. | 210—407 X |

REUBEN FRIEDMAN, *Primary Examiner.*

J. ADEE, *Assistant Examiner.*